US007308766B2

(12) United States Patent
Wallace

(10) Patent No.: US 7,308,766 B2
(45) Date of Patent: Dec. 18, 2007

(54) SATELLITE ANTENNA ALIGNMENT DEVICE AND METHOD

(76) Inventor: Rodney Leroie Wallace, c/o Warren E. Small, P.O. Box 1650, Pebble Beach, CA (US) 93953-1650

( * ) Notice: Subject to any disclaimer, the term of this patent is extended or adjusted under 35 U.S.C. 154(b) by 0 days.

(21) Appl. No.: 11/328,471

(22) Filed: Jan. 9, 2006

(65) Prior Publication Data

US 2007/0157482 A1 Jul. 12, 2007

(51) Int. Cl.
*G01C 17/02* (2006.01)
*G01C 9/36* (2006.01)

(52) U.S. Cl. ............................ 33/371; 33/352; 33/533

(58) Field of Classification Search .................. 33/301, 33/303, 340, 341, 347, 352, 370, 371, 372, 33/373, 529, 533, 534, 538; 343/760, 880, 343/882, 894

See application file for complete search history.

(56) References Cited

U.S. PATENT DOCUMENTS

| | | | |
|---|---|---|---|
| 51,675 A | 12/1865 | Abbott | |
| 4,495,706 A | 1/1985 | Kaminski | |
| 5,647,134 A | 7/1997 | Chou | |
| 5,797,083 A | 8/1998 | Anderson | |
| 5,870,059 A * | 2/1999 | Reynolds | 343/760 |
| 5,977,922 A | 11/1999 | Hemmingsen | |
| 6,081,240 A | 6/2000 | Hemmingsen, II | |
| 6,138,368 A * | 10/2000 | Dzierzbicki | 33/371 |
| 6,357,127 B1 | 3/2002 | Cochran | |
| 6,445,361 B2 | 9/2002 | Liu et al. | |
| 6,507,325 B2 | 1/2003 | Matz et al. | |
| 6,657,598 B2 | 12/2003 | Tulloch | |
| 6,683,581 B2 | 1/2004 | Matz et al. | |
| 6,697,026 B1 | 2/2004 | Hemmingsen, II | |
| 6,762,731 B1 | 7/2004 | Chou | |
| 7,095,378 B1 * | 8/2006 | Paquette | 343/757 |
| 7,183,997 B1 * | 2/2007 | Eakes et al. | 343/894 |
| 2002/0005816 A1 * | 1/2002 | Ginther et al. | 343/880 |
| 2004/0169114 A1 * | 9/2004 | Dierkes | 248/165 |

OTHER PUBLICATIONS

Unknown author; promotional literature for "Dish Aligner", date unknown.

* cited by examiner

*Primary Examiner*—R. Alexander Smith

(57) ABSTRACT

An alignment device and method for aligning an antenna with a satellite. The device includes a grooved cylindrical sleeve inserted into a ridged cylindrical sleeve, a raised azimuth indicator ring and a magnetic or digital compass mounted upon the grooved cylindrical sleeve, and a bubble level mounted on a capped cylindrical sleeve that fits over the grooved cylindrical sleeve. A known value of optimal azimuth alignment is offset from the North Magnetic Pole so that a reference and alignment mark may be placed on the antenna mounting pole. This alignment device and method eliminate the need for two technicians and eliminate the need for a signal strength measuring device.

5 Claims, 2 Drawing Sheets

SATELLITE ANTENNA ALIGNMENT DEVICE AND METHOD

FEDERALLY SPONSORED RESEARCH

Not Applicable

SEQUENCE LISTING OR PROGRAM

Not Applicable

BACKGROUND

1. Field of Invention

This present invention generally relates to satellite antenna alignment devices and more particularly to a satellite antenna alignment device which permits an installer to align a satellite antenna so as to receive the strongest signal in a particular geographic location from a particular satellite in geosynchronous orbit.

2. Description of the Related Art

Consumers are currently using satellite antennas to receive broadcast or rebroadcast signals from satellites owned and/or operated by companies that provide satellite television, radio, or Internet services. Examples of companies providing satellite broadcast services include, without limitation, SBC Global™, COMCAST™, DISH Network™, DIRECT TV™, and PRIMESTAR™. Generally, these companies will utilize a satellite in geosynchronous orbit and which they own or lease to transmit television, radio, or Internet signals to their customers. To receive these signals, customers typically use internally or externally mounted antennas that are connected to a radio, television, or personal computer in their homes or workplaces. In order for the satellite to receive the strongest signal from the satellite, the antenna, which is typically in the shape of a concave dish, must be properly aligned with respect to the satellite transmitting the desired signal(s).

The installation of a satellite antenna dish has historically been a laborious and time-consuming process that typically involves two individuals to: (1) use a bubble level to horizontally stabilize and position a mounting pole which supports the antenna dish, (2) estimate the desired azimuth by using a compass to determine the local azimuth heading of the North Magnetic Pole, (3) manually turn the antenna dish to the estimated local azimuth heading of the North Magnetic Pole, (4) manually tilt the antenna dish with a protractor to align the antenna dish along the recommended elevation for the installation location, (5) use an electronic sensing device to determine the azimuth heading along which the strongest satellite broadcast signal strength will be received, and (6) manually turn the antenna dish to that azimuth heading along which the strongest satellite broadcast signal strength will be received. The foregoing procedure normally takes 30 to 45 minutes and requires the installation team to carry, in addition to standard installation tools such as wrenches, screwdrivers, etc., a magnetic compass, a bubble level, a protractor, and some type of separately-configured electronic sensing device.

Numerous attempts have been made in the past to address these problems. For example, the devices disclosed in U.S. Pat. Nos. 5,977,922 (Hemmingsen, 1999); 6,081,240 (Hemmingsen, 2000); 6,445,361 (Liu et. al., 2002); 6,683,581 (Matz et. al., 2004); and 6,697,026 (Hemmingsen, 2004) address this problem by attaching an alignment device such as a magnetic or digital compass to the antenna support arm or to the antenna itself. However the support arm can only move relative to the antenna reflector and any such movement or misalignment will cause or contribute to an incorrect alignment with respect to the desired satellite. Further, devices that are affixed to a support arm or to the antenna itself are not easily visible to the installer during the installation and alignment process. Further still, the large number of types and shapes of support arms and antenna dishes give rise to the need for a large number of different adapters to be available to the installer. Further still, all of these devices must be physically attached and secured to the antenna or the support arm which means that the alignment takes place after the antenna is placed on the mounting pole, a cumbersome, manhandling process at best. Finally, most of these devices do not lend themselves to easy detachment or mobility which, in turn, limits the likelihood of their repetitive use for multiple installations. In other words, these alignment devices are typically mounted permanently to the support arm or the antenna itself.

Another line of devices sought to address the aforementioned alignment problems through the use of a "set top" box that is placed on or adjacent to a television receiver to which the antenna is attached. First, the installer connects the antenna to the set top box by means of a cable that will be used to transmit signal strength data to the set top box. Next, the installer points the antenna in the general direction of the desired satellite. Then, the installer fine-tunes the antenna's alignment by using the signal strength meter displayed on the television screen or the audio tone emitted by the set top box. The installer continues adjustments until the visual display of signal strength indicates a maximum value of signal strength which occurs when the antenna is in its optimal alignment position. This procedure typically requires two individuals because the antenna is typically mounted outside while the television, screen, and set top box are inside and out of the installer's view. While it is possible for one installer to use this method, it is impractical in view of the numerous trips required to check the signal strength presentation, return to the antenna to make adjustments, check the signal strength presentation again, return to the antenna to make another adjustment, etc. Whether the installation is done by one person or two, the process is time-consuming and/or costly.

Still another line of devices incorporated the use of a light emitting diode ("LED") in the receiving antenna that uses the feedback signal from the set top box on the television to give the installer a visual indication of signal strength. While this solution may serve to permit installation by only one person, practitioners have reported that the user may not always discern the changes in the flash rate of the LED as the signal strength increases or decreases giving rise to positioning at less than optimal alignment. Further, this method is only effective when the antenna alignment is close to its desired position; it cannot be used to initially position the antenna.

One skilled in the art will recognize that all of these methods involve aligning a satellite antenna after it has been mounted on its foundation which is usually a pole that has been vertically aligned and leveled (plumbed). With the exception of the device marketed as the "Dish-Aligner," the prior art is silent with respect to attempting alignment prior to mounting the satellite antenna on its foundation. However, even the "Dish-Aligner" requires the use of a set top box to fine-tune the alignment for optimal positioning so the problem of a two-person installation team remains. The current invention solves the foregoing problems by permitting one individual to correctly and accurately align the satellite antenna before it is actually installed on the mounting pole.

Typically, the manufacturer of a satellite antenna or the owner/operator of the satellite will provide alignment information to customers in a particular region on the basis of U.S. Postal Service Zip Codes. By way of example, a customer in the 93940 Zip Code area of the United States (Monterey, Calif.) who desires to install a satellite television system that receives its signal from the DISH Network™ geosynchronous satellite would contact DISH Network™ to receive the optimal azimuth and elevation settings for a DISH Network satellite antenna in the 93940 Zip Code area. Similarly, a customer in the 89110 Zip Code area of the United States (Las Vegas, Nev.) who also desires to install a satellite television system that receives its signal from the DISH Network™ geosynchronous satellite would contact DISH Network™ to receive the optimal azimuth and elevation settings for a DISH Network satellite antenna in the 89110 Zip Code area. Because of the differences in longitude and elevation above sea level of these two locations, the optimal azimuth and elevation settings would be different. Likewise, customers desiring to install a satellite television system that receives its signal from the geosynchronous satellite of another satellite broadcast service provider would contact that particular manufacturer/operator to receive the optimal azimuth and elevation settings for that manufacturer/operator's satellite antenna in the desired Zip Code area.

The present invention contemplates the use of this information from the manufacturer or broadcast-operator to align a satellite antenna without using electronic sensing devices such as a signal strength meter, a set-top box, or a LED. The present invention also combines a bubble level and compass on a single instrument thereby permitting a single installer to level the antenna mounting pole and then determine the optimal azimuth heading along which to align the antenna dish.

The present invention can also be used by the manufacturer of a satellite antenna or the owner/operator of the satellite to determine the optimal alignment information for customers in a particular region that has not yet been charted. The antenna is simply pointed in the general direction of the desired antenna and gradually rotated in small increments until optimal signal strength is recorded. The azimuth is simply read off of the azimuth alignment ring attached to the present invention and recorded for promulgation to potential customers.

Objects and Advantages

The present invention has been designed to solve the foregoing problems found in the prior art. Accordingly, the objects and advantages of the present invention are:

(1) to provide an improved satellite alignment device.

(2) to provide an improved satellite alignment device that is inexpensive, easy to manufacture, and easy to operate with little or no technical training.

(3) to provide an improved satellite alignment device that accurately and quickly aligns a satellite dish with a desired satellite.

(4) to provide an improved satellite alignment device that does not require additional electronic instrumentation to manually align the satellite antenna with a desired satellite.

(5) to provide an improved satellite alignment device that is functional in multiple geographic locations.

(6) to provide an improved satellite alignment device that obtains better signal-receiving and better signal-transmitting performance.

(7) to provide an improved satellite alignment device that permits the installation of a satellite antenna by one person.

(8) to provide an improved satellite alignment device that is not mounted on the satellite antenna.

(9) to provide an improved satellite alignment device that is not mounted on the satellite antenna and therefore reusable for multiple satellite antenna installations and alignments.

(10) to provide an improved satellite alignment device that can be used by the manufacturer of a satellite antenna or the owner/operator of the satellite to determine the optimal alignment azimuth information for a particular geographic location.

Further additional objects, advantages, and features of my invention will become apparent in part from a consideration of the drawings and the ensuing description of the invention and in part will become apparent to those having ordinary skill in the art upon examination of the following drawings and description of the invention or learned from the practice of the invention.

SUMMARY

In accordance with the present invention, a satellite antenna alignment device comprising a grooved cylindrical sleeve inserted into a ridged cylindrical sleeve, a raised azimuth indicator ring and a magnetic or digital compass mounted upon the grooved cylindrical sleeve, and a bubble level mounted on a capped cylindrical sleeve that fits over the grooved cylindrical sleeve.

DRAWINGS

Drawing Figures

REFERENCE NUMERALS IN DRAWINGS

1—Cylindrical Sleeve
2—Cylindrical insert
3—Ridge
4—Groove
5—Azimuth indicator mark
6—Vertical slot
7—Azimuth indicator ring
8—Magnetic compass
9—Cylindrical cap
10—Bubble level

DETAILED DESCRIPTION

Preferred Embodiment

Figure 1:
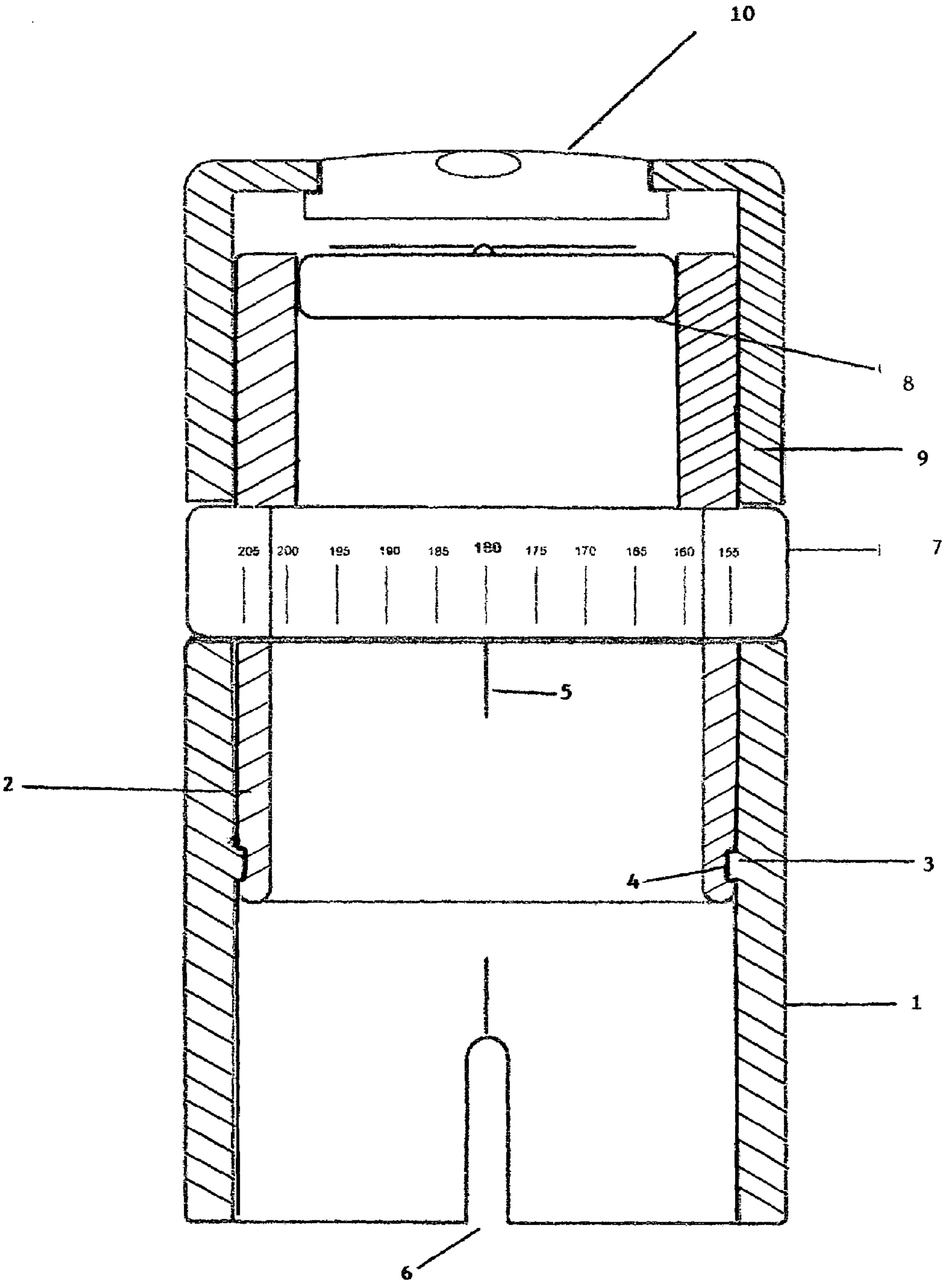
FIG. 1 shows a partial cross-section (side view) of the preferred embodiment of the present invention.
Figure 2:
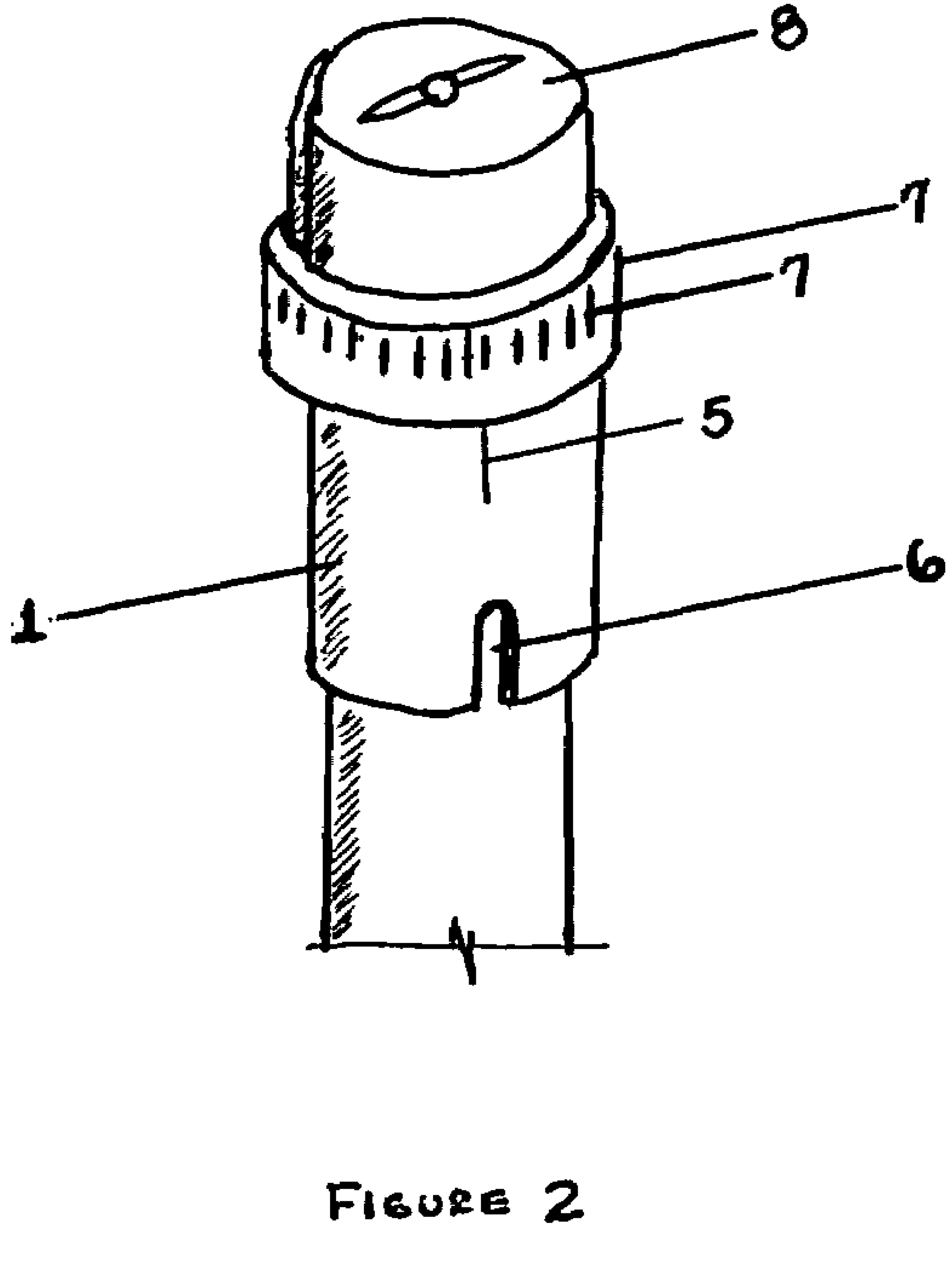
FIG. 2 shows a perspective view of the preferred embodiment of the present invention.

The preferred embodiment of the present invention is illustrated in FIG. 1 (partial cross-section, side view) and FIG. 2 (perspective view). A cylindrical sleeve 1 made of plastic, polyvinyl chlorate (PVC), metal or any other suitable material holds a shorter cylindrical insert 2 which is also a cylindrical sleeve but of slightly smaller diameter than cylindrical sleeve 1 and made of the same or similar material as cylindrical sleeve 1. Cylindrical sleeve 1 has a ridge 3 which fits snugly into a groove 4 on cylindrical insert 2 thereby holding cylindrical insert 2 in place so that the outer surface of cylindrical insert 2 is flush against the inner surface of cylindrical sleeve 1 and allowing cylindrical insert 2 to rotate freely within cylindrical sleeve 1. Cylindrical sleeve 1 has an etched, printed, inscribed, embossed, or otherwise permanently marked azimuth indicator mark 5 which extends vertically downward from the upper edge of cylindrical sleeve 1. Cylindrical sleeve 1 also has a vertical slot 6 through cylindrical sleeve 1 and extending upward from the lower edge of cylindrical sleeve 1 and positioned directly under azimuth indicator mark 5.

An circular azimuth indicator ring 7 with etched, printed, inscribed, embossed or otherwise permanently marked azimuth readings is permanently mounted circumferentially around cylindrical insert 2 so that the outer diameter of circular azimuth indicator ring 7 is the same as the outer diameter of cylindrical sleeve 1 and the lower edge of circular azimuth indicator ring 7 rests on the upper edge of cylindrical sleeve 1. A magnetic compass 8 is mounted inside cylindrical insert 2 so that a vertical plane passing through azimuth indicator ring 7 at the azimuth values of 180 degrees and 360 degrees would be in alignment with the North-South line on the face of magnetic compass 8.

A cylindrical cap 9 made of the same material as cylindrical sleeve 1 and having the same thickness and outer circumference as cylindrical sleeve 1 fits over cylindrical insert 2 so that the lower edge of cylindrical cap 9 rests upon the upper edge of circular azimuth ring 7 and the inner surface of cylindrical cap 9 is flush against the outer surface of cylindrical insert 2. A bubble level 10 is inserted into the upper surface of cylindrical cap 9 so that bubble level 10 can observe the movement of the air bubble in bubble level 10 by looking downward at cylindrical cap 10.

OPERATION OF THE INVENTION

Preferred Embodiment

In the preferred embodiment of this invention, the satellite antenna installer would contact the manufacturer of the satellite antenna dish and/or the operator of the satellite broadcasting or rebroadcasting the desired satellite television, radio, or Internet signal(s) to obtain the optimal azimuth and elevation settings for the geographic location of the site of the intended installation. The installer would then rotate cylindrical insert 2 with respect to cylindrical sleeve 1 until the value of the optimal azimuth setting on azimuth indicator ring 7 is exactly aligned with azimuth indicator mark 5. Since cylindrical insert 2 fits tightly inside cylindrical sleeve 1, there is little or no chance of inadvertent movement. Nonetheless, other embodiments of this invention contemplate methods of locking the position of cylindrical insert 2 with respect to cylindrical sleeve 1.

After positioning cylindrical insert 2 and cylindrical sleeve 1 with the optimal settings for azimuth, the satellite antenna installer would slide cylindrical sleeve 1 over the pole upon which the antenna would be mounted. The antenna installer would then move the pole in transverse vertical planes until the air bubble in bubble level 10 rests between the positioning lines scribed on the vessel therein. After the pole has been "leveled," the installer would remove cylindrical cap 9 and rotate cylindrical sleeve 1 until the needle in magnetic compass 8 is pointing to the North Magnetic Pole and aligned along the North-South Axis on the face of the compass. The installer would then use vertical slot 6 to make a vertical mark on the satellite antenna mounting pole. Since vertical slot 6 is positioned directly under azimuth indicator mark 5, and azimuth indicator mark 5 is exactly aligned with the optimal azimuth setting on azimuth indicator ring 7, the installer can use the vertical mark on the satellite antenna mounting pole to position the satellite antenna along the optimal azimuth setting recommended by the manufacturer.

If the optimal azimuth alignment for a particular geographic location is not known, the technician would attach the present invention to any commercially available device that measures signal strength and presents an audio or visual display so that the technician can determine when the maximum signal strength is achieved. The technician would slide cylindrical sleeve 1 over the pole upon which an antenna would be mounted. The technician would then move the pole in transverse vertical planes until the air bubble in bubble level 10 rests between the positioning lines scribed on the vessel therein. After the pole has been "leveled, "the technician would remove cylindrical sleeve 1 and slide the satellite antenna onto the mounting pole. The technician would then rotate the antenna on the mounting pole until the antenna was pointing in the direction of the strongest broadcast signal. The technician would mark the mounting pole with a vertical line corresponding to the azimuth providing the strongest signal, thereby creating an azimuth indicator mark 5.

The technician would then remove the antenna and again slide cylindrical sleeve 1 over the mounting pole so that vertical slot 6 is aligned with azimuth indicator mark 5. The installer would then rotate cylindrical insert 2 with respect to cylindrical sleeve 1 until the needle in magnetic compass 8 is pointing to the North Magnetic Pole and aligned along the North-South Axis on the face of the compass. The technician would read the value of azimuth on the azimuth indicator ring 7 that is directly above the azimuth indicator mark 5 such mark being the value of optimal azimuth alignment for that particular geographic location.

Description—Alternative Embodiments

The preferred embodiment of this invention contemplates sliding cylindrical sleeve 1 over an antenna mounting pole of a diameter that corresponds to industry standards for mounting poles associated with household satellite antenna systems. Another embodiment of the present invention contemplates inserting cylindrical sleeve 1 into another cylindrical sleeve of large enough diameter to slide over antenna mounting poles of larger diameter than those corresponding to industry standards so as to support larger satellite dishes or customized satellite dishes.

Still, other embodiments of the present invention contemplate different materials comprising cylindrical sleeve 1, cylindrical sleeve 2, and cap 9.

In another alternative embodiment of the present invention, a digital compass would replace magnetic compass 8.

In another embodiment of the present invention, both grooved cylindrical sleeve 2 and cap 9 are composed of materials other than cylindrical sleeve 1. In yet another embodiment of the present invention, either grooved cylindrical sleeve 2 or cap 9 are composed of materials other than cylindrical sleeve 1.

It should be further understood that additional variations and modifications and special adaptations of the preferred embodiment of the present invention may be utilized without departing from the scope of the present invention as set forth in the following claims.

Conclusion, Ramifications, and Scope

Accordingly, the reader will see that the present invention offers many advantages over those disclosed by the prior art. The present invention discloses an improved antenna alignment device that is inexpensive, easy to manufacture, easy to operate, and most important, eliminates the need for a second technician to install and align a satellite antenna. Further, the present invention discloses an improved antenna alignment device that neither requires additional electronic equipment to manually align a satellite antenna nor requires the permanent mounting of alignment devices on the antenna arm or the antenna itself. Further still, the present invention discloses an improved antenna alignment device that can be used for multiple installations and alignments and is not restricted to a particular geographic location. Finally, the present invention discloses an improved antenna alignment device that permits the manufacturer of a satellite antenna or the owner/operator of the satellite to determine the optimal alignment azimuth information for a particular geographic location.

Although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by the examples given.

I claim:

1. A satellite antenna alignment device comprising:

a. a ridged cylindrical sleeve with a ridge protruding from its inner surface, composed of plastic, metal, polyvinyl chlorate, or other material suitable for exterior exposure, of sufficient inner surface diameter to fit snugly over antenna mounting poles manufactured to industry standards for residential satellite antenna dishes and containing a permanently marked vertical line extending downward from the upper edge of said ridged cylindrical sleeve and centered directly above a vertical slot cut through and upward from the lower edge of said ridged cylindrical sleeve, b. a grooved cylindrical sleeve composed of the same material as said ridged cylindrical sleeve and having a groove in its outer surface, said grooved cylindrical sleeve being of smaller diameter than said ridged cylindrical sleeve and inserted inside said ridged cylindrical sleeve so that said ridge fits snugly into said groove and the outer surface of said grooved cylindrical sleeve fitting snugly against the inner surface of said ridged cylindrical sleeve so as to permit labored rotational movement of said grooved cylindrical sleeve, c. a raised circular azimuth indicator ring protruding outward from said grooved cylindrical sleeve so that said azimuth indicator ring has an outer diameter equal to the outer diameter of said ridged cylindrical sleeve, said azimuth indicator containing permanent numerical markings from 0 degrees to 359 degrees and positioned so that the lower surface of said azimuth indicator rests upon the upper edge of said ridged cylindrical sleeve, d. a magnetic compass mounted face-up inside said grooved cylindrical sleeve and positioned so that a vertical plane passing through said numerical markings of 0 degrees and 180 degrees would also pass through the North-south axis on the face of said magnetic compass, e. a capped cylindrical sleeve composed of the same material as said ridged cylindrical sleeve, having the same outer diameter and thickness as said ridged cylindrical sleeve, being of sufficient height to cover the upper portion of said grooved cylindrical sleeve and resting on the upper surface of said azimuth indicator ring, and f. a bubble level imbedded in said capped cylindrical sleeve so as to be visible to an observer looking downward at said capped cylindrical sleeve.

2. The invention according to claim 1 wherein said grooved cylindrical sleeve and said capped cylindrical sleeve are composed of a material other than said ridged cylindrical sleeve.

3. The invention according to claim 1 wherein said grooved cylindrical sleeve or said capped cylindrical sleeve are composed of a material other than said ridged cylindrical sleeve.

4. The invention according to claim 1 wherein said ridged cylindrical sleeve is inserted into a second cylindrical sleeve with a diameter sufficiently large to slide over an antenna pole of diameter larger than that typically used for residential satellite antenna installations.

5. A method for determining the azimuth of strongest satellite signal strength comprising the steps of:

a. placing a satellite antenna on an antenna mounting pole, b. orienting said satellite antenna so as to receive the strongest signal from a given broadcast satellite in geosynchronous orbit, c. marking said antenna mounting pole with a vertical mark aligned with the direction corresponding to the azimuth from which said strongest signal from said satellite is received, d. removing said satellite antenna from said antenna mounting pole, e. placing a satellite antenna alignment device on said mounting pole and aligning a magnetic compass and azimuth indicator ring located on a top portion of said satellite alignment device to coincide with the North-South axis on the face of said magnetic compass, f. while keeping a top portion of said antenna alignment device steady, rotating a bottom portion of said antenna alignment device so that a vertical slot extending upwards from a bottom edge of said bottom portion of said antenna alignment device and a vertical azimuth indicator mark directly above said vertical slot and extending downward from an upper edge of said bottom portion of said antenna alignment device are directly in line with said vertical mark on said antenna mounting pole, g. reading the value of azimuth on said azimuth indicator ring directly above said azimuth indicator mark, h. recording said value of azimuth, and i. repeating steps a through h for any other location for which the azimuth of strongest satellite signal strength is desired.

* * * * *